Dec. 8, 1953  F. D. KORKOSZ  2,661,654
PROJECTION APPARATUS FOR PROJECTING SPOTS
OF LIGHT SIMULATING STARS UPON A SURFACE
Filed Sept. 21, 1951  2 Sheets-Sheet 1

INVENTOR.
Frank D. Korkosz

Dec. 8, 1953 F. D. KORKOSZ 2,661,654
PROJECTION APPARATUS FOR PROJECTING SPOTS
OF LIGHT SIMULATING STARS UPON A SURFACE
Filed Sept. 21, 1951 2 Sheets-Sheet 2
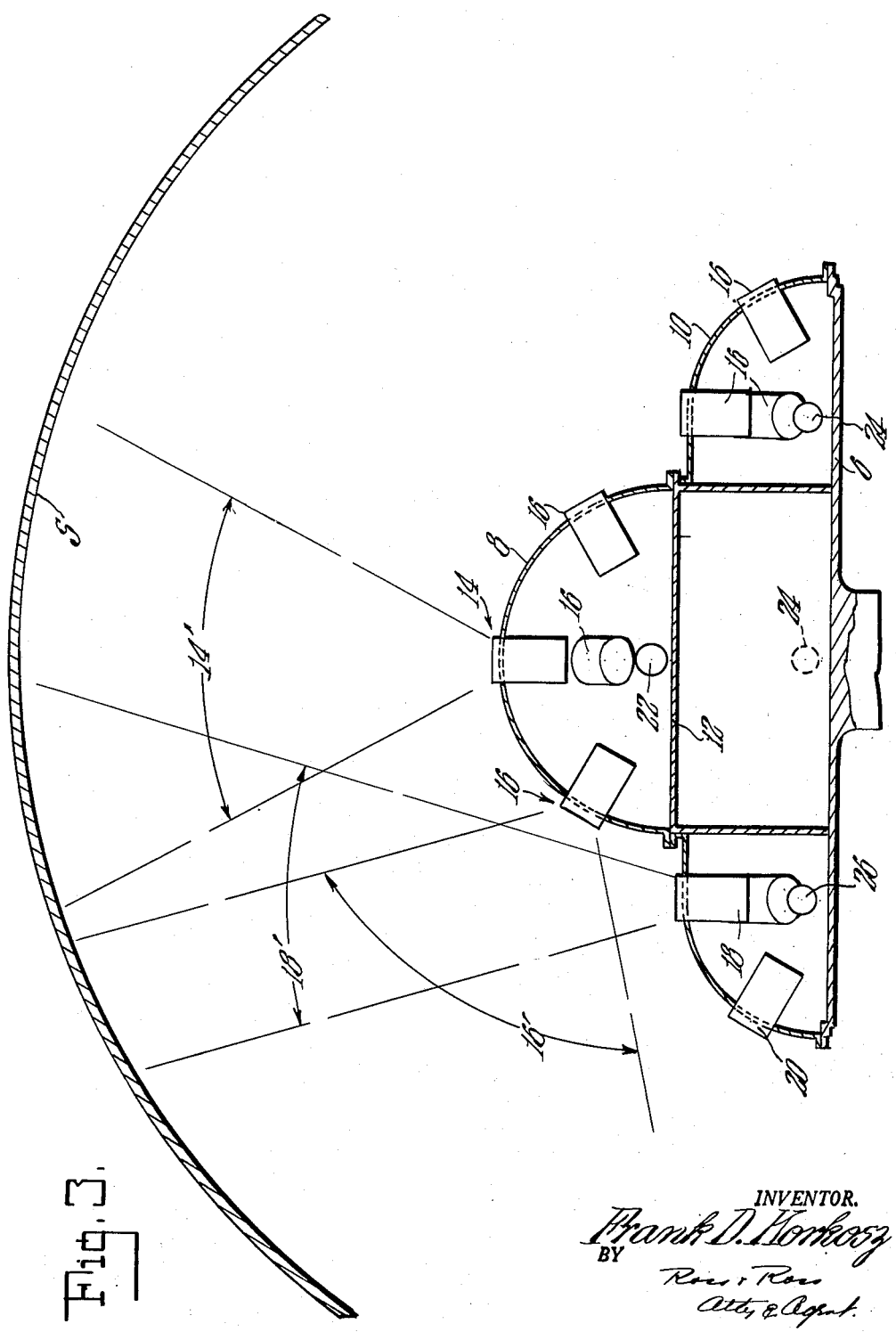
INVENTOR.
Frank D. Korkosz
BY
Ross & Ross
Atty. & Agent.

Patented Dec. 8, 1953

2,661,654

UNITED STATES PATENT OFFICE 2,661,654

PROJECTION APPARATUS FOR PROJECTING SPOTS OF LIGHT SIMULATING STARS UPON A SURFACE

Frank D. Korkosz, Chicopee, Mass., assignor to American Planetarium Corporation, Chicopee, Mass., a corporation of Massachusetts Application September 21, 1951, Serial No. 247,726

7 Claims. (Cl. 88—24)

This invention relates to improvements in projection apparatus of the general type shown and described in U. S. Letters Patent No. 2,168,799 issued August 8, 1939.

The principal objects and advantages of the present invention are directed to the provision of a novel combination and arrangement in projection apparatus whereby light spots of different brilliancy and representing stars and heavenly bodies of different magnitudes are projected onto a surface such as a dome.

According to special features of the invention, a plurality of lens systems are provided for projecting spots of lights onto a surface over predetermined areas thereof and spots of light of certain intensity are projected from a certain lens system or systems onto an area of surface covered by another lens system or systems whereby spots of light representing stars of different magnitudes may be projected onto a surface in the desired relative arrangement.

Such is accomplished by the provision of separate compartments having a plurality of lens systems and light sources in association therewith.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 3 is a sectional elevational view through the apparatus shown in Figs. 1 and 2.

Figure 1:
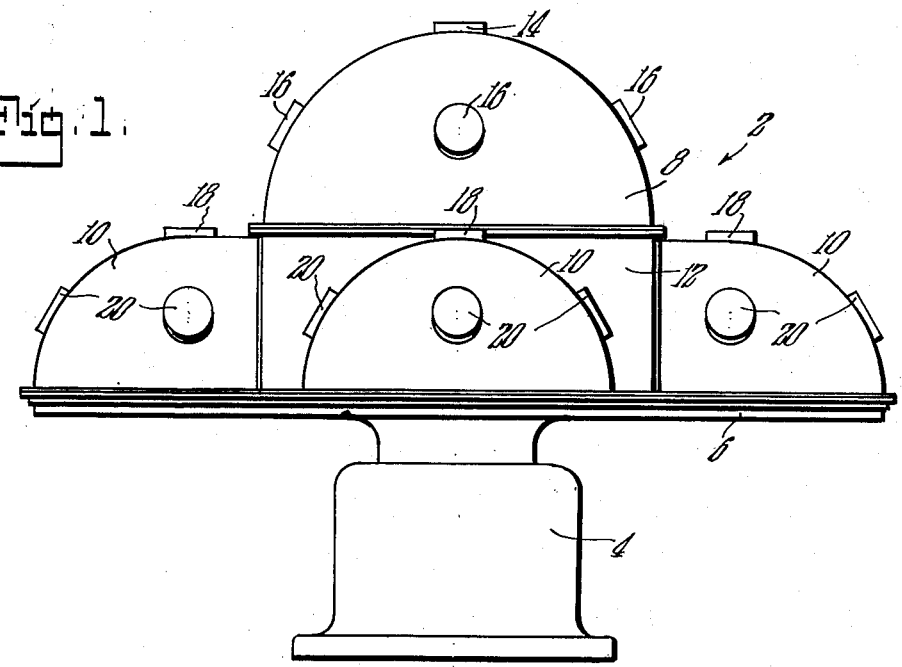
Fig. 1 is an elevational view of projection apparatus embodying the novel features of the invention.
Figure 2:
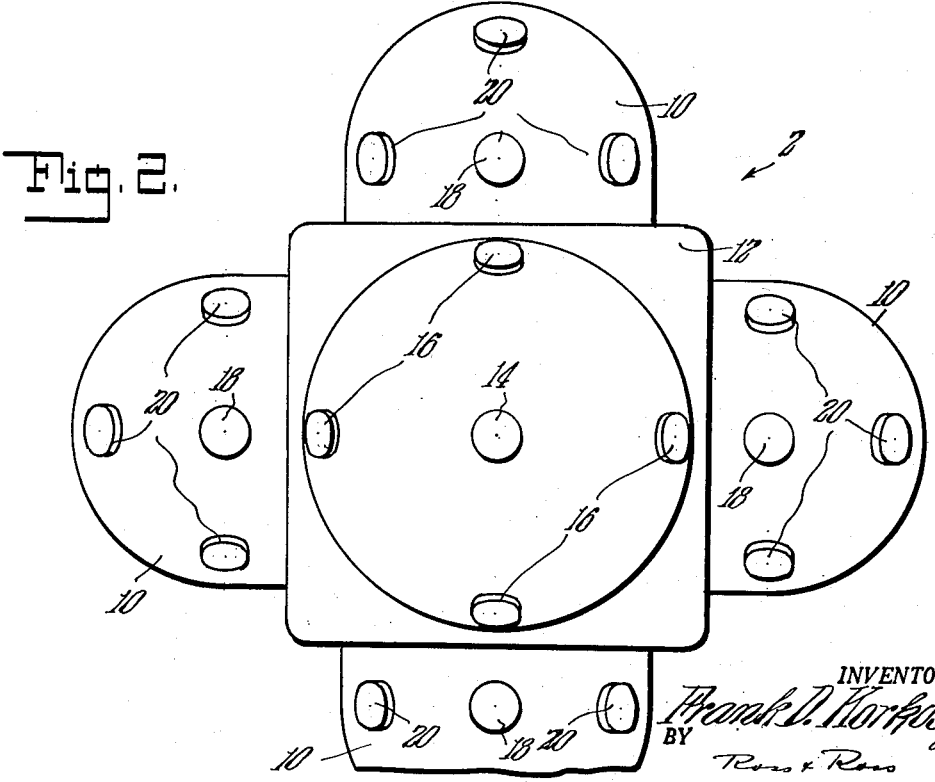
Fig. 2 is a plan view of the apparatus shown in Fig. 1.

Referring now to the drawings more in detail, the invention will be fully described.

The projection apparatus of the invention is represented by 2 in the drawings and in a general way includes a base 4 with relation to which is movably mounted a support 6 having a central primary dome 8 and a plurality of secondary domes 10 secured thereto.

Mechanism will be associated with the base 4 for rotating or oscillating the support 6 on an axis or axes as is usual with apparatus of the type to which the invention relates and forms no part of the present invention.

The domes 2 and 10 are hollow and are secured on the top and sides of a housing 12 secured to the support 6 and the parts are arranged so that the domes are not in communication with one another so that light sources of the domes will not interfere with the light sources of other domes.

The dome 8 as shown is semi-spherical while the secondary domes 10 are substantially quarter-spherical with the latter disposed inwardly of and around the dome 8.

The central dome 8 is provided with a central lens system 14 for projecting light rays and a plurality of peripheral similar systems 16. The secondary domes are provided with similar central and peripheral systems 18 and 20.

As in the patents referred to, the lens systems will include objectives or lenses for projecting onto a surface S light rays from a light source, through apertures in a disc associated with the system.

The angle of projection of the lens systems may be as desired. These angles may be similar or different depending upon the projecting surface and the area thereof to be covered by a lens system or systems. For illustrative purposes, the angles covered by lens systems 14, 16, 18 and 20 are represented by angles 14', 16', 18' and 20'.

It will be observed that the area of the surface covered by the angle of projection of one lens system may be also covered by another lens system or systems.

The apertured discs referred to will have the apertures arranged relative to the lens systems so that the spots of light on the surface S and representing the stars will have the desired relative location.

It is desired that the light spots on the surface S have relative intensities corresponding to the relative magnitudes of the stars as they are.

This is accomplished by having certain lens systems project light spots of different intensities by means of light sources of different brilliancy or power. In this way spots from certain lens systems may project light spots simulating certain magnitudes in areas on the screen covered by other lens systems whereby the light spots are not only relatively disposed as are the stars but the relative magnitudes thereof are displayed.

Rather than attempt to simulate the different magnitudes of the stars by the relative sizes of the apertures of the lens discs it is preferable to employ light sources of different power.

As an illustration, light sources which may be electric light bulbs are indicated by 22, 24 and 26. These will have different powers and being associated with different lens sources of different domes the disposition of light spots of different intensities representing different magnitudes are projected from certain lens systems onto areas covered by other and different lens systems.

Each dome may carry as many lens systems as desired and there may be any desired number of light sources to provide light spots of any desired magnitudes.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Projection apparatus for projecting spots of light simulating stars upon a surface comprising in combination, a support including a central housing, a hollow central dome on the upper side of said housing being substantially in the form of a half-sphere, a plurality of hollow auxiliary domes on said support at the sides of and adjacent said central dome being substantially in the form of quarter-spheres, projecting lens systems carried by each of said auxiliary domes arranged to direct light rays radially therefrom, and light sources for each said lens system.

2. Projection apparatus comprising in combination, a support including a central housing, a primary central dome on the upper side of said housing being substantially in the form of a half-sphere having a convex surface disposed on the upper side thereof, a plurality of separate secondary domes on said support below said primary dome having inner sides at opposite and adjacent sides of said primary dome and being substantially in the form of quarter-spheres having outer convex surfaces disposed on outer upper sides thereof, a plurality of projecting lens systems carried by each of said domes arranged to direct light rays radially therefrom, and light sources for said lens systems in each of said domes.

3. Projection apparatus comprising in combination, a support having a horizontal supporting surface, a central housing on said support having vertical walls extending upwardly therefrom and an upper horizontal wall spaced above the supporting surface of the support, a primary central dome on the upper wall of the housing being substantially in the form of a hollow half-sphere having a convex surface extending upwardly from the said upper wall, a plurality of secondary domes on said support adjacent the vertical walls and below the plane of the horizontal wall of the housing being substantially in the form of hollow quarter-spheres having convex surfaces extending upwardly from said supporting surface of the support and away from the vertical walls of the housing, projecting lens systems carried by each of said domes arranged for directing light rays radially of said domes, and light sources in said domes for said lens systems.

4. A projection apparatus for projecting spots of light simulating stars upon a surface comprising in combination, a support, a plurality of separate domes carried by said support, each of said domes having a plurality of lens systems for projecting the light spots, each of said domes having a light source of a different intensity, each of said lens systems having a certain angle of projection for projecting light spots upon a certain area of the surface with certain of said lens systems being disposed relative to the other of said lens systems whereby certain areas of the surface are covered by more than one of said lens systems.

5. A projection apparatus for projecting spots of light simulating stars upon a surface comprising in combination, a support, a plurality of separate domes carried by said support, each of said domes having a lens system for projecting the light spots onto the surface, a light source for each of said lens systems, said light sources being of different intensities, each of said lens systems having a certain angle of projection and being relatively arranged for projecting light spots onto an area of the surface partially covered by another of said lens systems.

6. A projection apparatus for projecting spots of light simulating stars upon a screen comprising in combination, a support, a plurality of separate domes carried by said support, each of said domes having a lens system for projecting light spots onto a screen, light sources in said domes for each of said lens systems, each of said lens systems having a certain angle of projection and being relatively arranged for projecting light spots onto a screen covered by other of said lens systems having light sources of relatively different brilliancy associated therewith.

7. A projection apparatus for projecting spots of light simulating stars upon a surface comprising in combination, a support, a plurality of separate domes carried thereby, each of said domes having a lens system for projecting light spots onto a screen, light sources in said domes for each of said lens systems, each of said lens systems having a certain angle of projection and being relatively arranged for projecting light spots onto the surface covered by other of said lens systems and having light sources of relatively different brilliancy associated therewith.

FRANK D. KORKOSZ.

References Cited in the file of this patent

UNITED STATES PATENTS

| Number | Name | Date |
|---|---|---|
| 1,616,736 | Bauersfeld | Feb. 8, 1927 |
| 1,693,969 | Williger et al. | Dec. 4, 1928 |
| 2,168,799 | Korkosz et al. | Aug. 8, 1939 |
| 2,178,352 | Unglaube et al. | Oct. 31, 1939 |
| 2,483,216 | Marshall | Sept. 27, 1949 |

FOREIGN PATENTS

| Number | Country | Date |
|---|---|---|
| 322,507 | Germany | July 1, 1920 |